P. R. OWENS.
TEMPERATURE CONTROLLING SYSTEM.
APPLICATION FILED FEB. 27, 1920.
1,422,886.
Patented July 18, 1922.
2 SHEETS—SHEET 1.
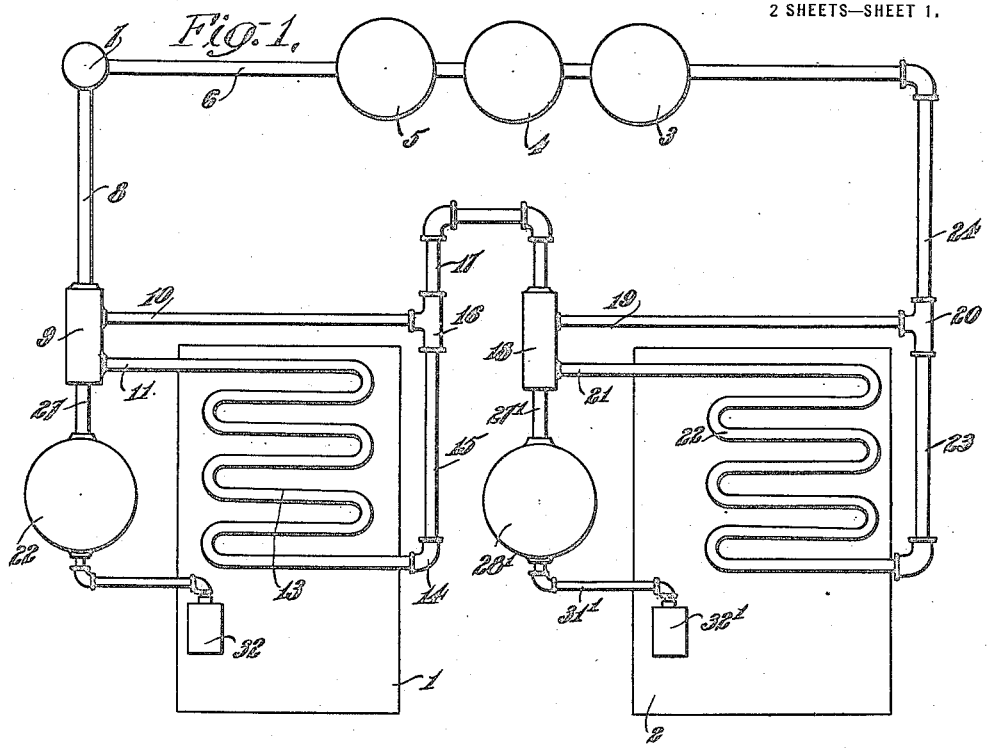
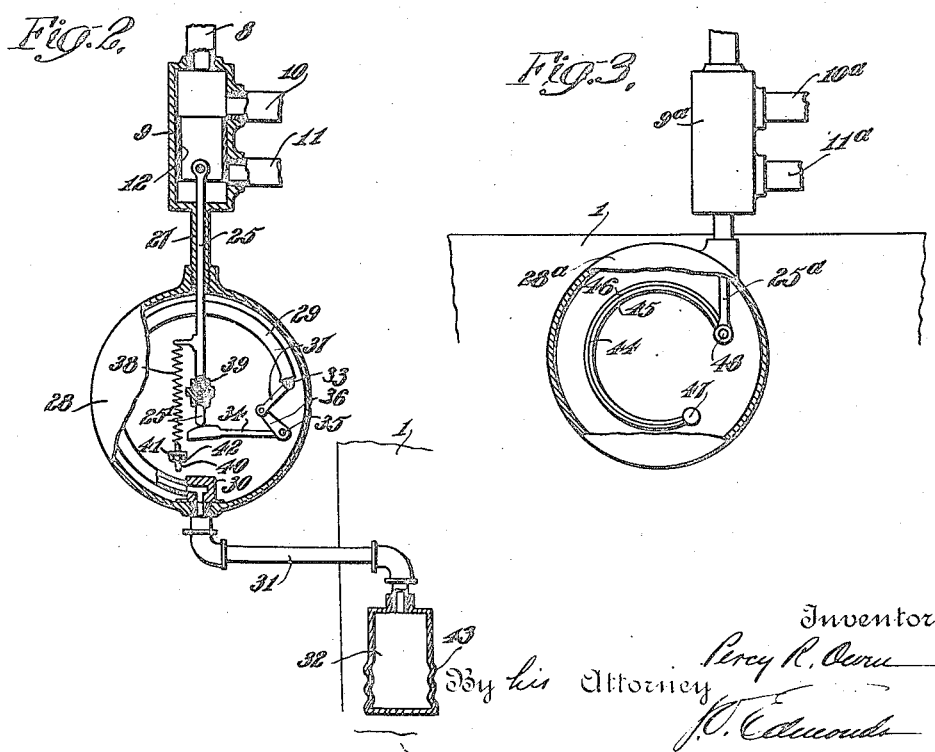
Inventor
Percy R. Owens
By his Attorney

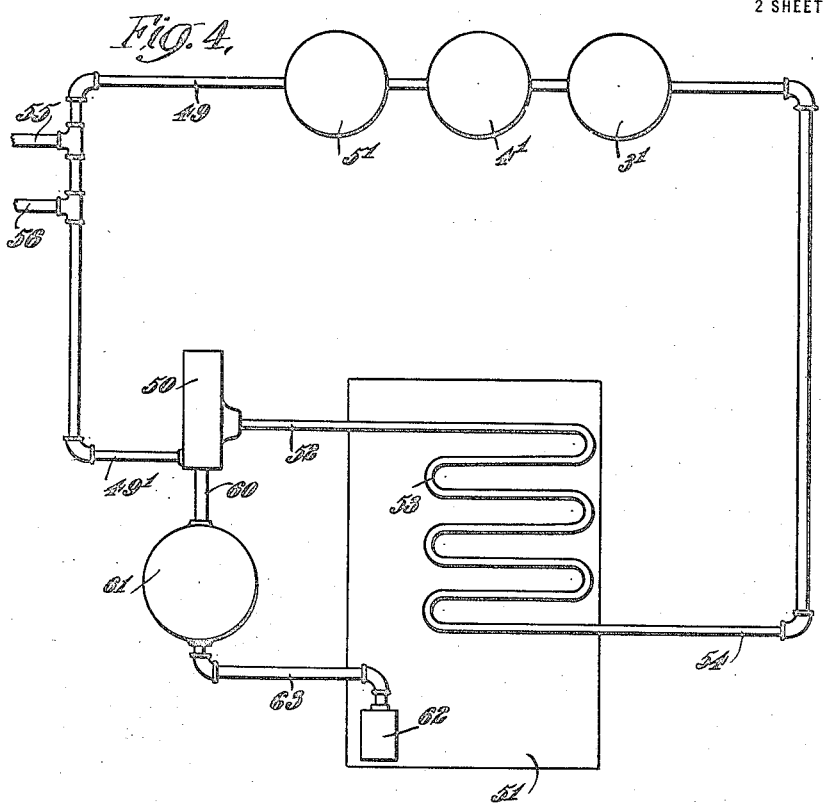
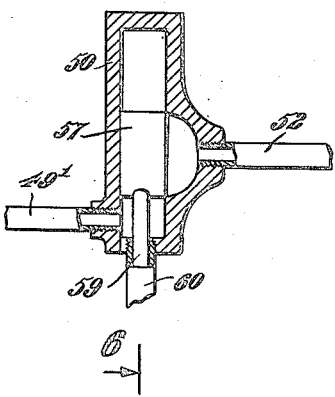
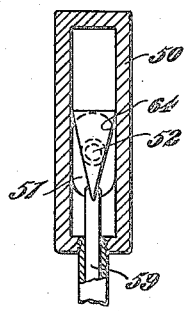

UNITED STATES PATENT OFFICE.

PERCY R. OWENS, OF MOUNT KISCO, NEW YORK.

TEMPERATURE-CONTROLLING SYSTEM.

1,422,886.  Specification of Letters Patent.  Patented July 18, 1922.

Application filed February 27, 1920. Serial No. 361,687.

*To all whom it may concern:*

Be it known that I, PERCY R. OWENS, a citizen of the United States, residing at Mount Kisco, in the county of Westchester and State of New York, have invented certain new and useful Improvements in Temperature-Controlling Systems, of which the following is a specification.

My invention relates to a temperature controlling system by which the temperature of one or a plurality of points may readily and effectively be controlled. The system is particularly applicable in maintaining the temperatures at a plurality of points within predetermined ranges. The system is particularly applicable to the control of temperatures in refrigerating systems in which one or more refrigerators may be maintained at predetermined temperatures.

In refrigerating systems now in use, in which a plurality of refrigerators are provided with coils through which refrigerating fluid, such as ammonia, is caused to pass, various difficulties arise under certain conditions. A system is well known in which the coils of a plurality of refrigerators are connected together in series with bypasses extending in parallel with the refrigerator coils. Valves are provided in the inlet pipes for the coils and in the bypass pipes, which valves may be adjusted to allow more or less fluid to pass through the coils or the bypasses. One of the refrigerators is considered as the master and is provided with a thermostatic device by which the proportion of refrigerating fluid entering the coil of that refrigerator is governed.

With such a system, a large amount of meat, for example, may be inserted into the master refrigerator, which causes a large proportion of refrigerating fluid to be passed into the coils of that refrigerator, with the result that one or more of the other refrigerators in the series may be made too cold. Or the master refrigerator may be in a room exposed to outside temperature and may during cold weather require no refrigerating fluid within its coils, in which case the other refrigerators of the series would become too warm.

In accordance with my invention, a valve is positioned to govern the inlet pipe for the refrigerating coil of a refrigerator, and if a plurality of refrigerators are used, a single valve is provided for each refrigerator to govern the inlet and bypass openings for each refrigerator. A thermostatic device is located in each refrigerator and is connected with the valve for that refrigerator so as to govern the position thereof. In the preferred form of my invention, the position of the valve is controlled by a series of connections including a hollow curved member which is connected with a container within the refrigerator, the hollow member, container and connections being filled with a fluid having a high coefficient of expansion. Upon the rise of temperature within the refrigerator, the hollow curved member tends to move outwardly, that is, tends to straighten itself out, and I utilize this movement to govern the position of the valve. I find that with such a system accurate adjustments may be made so as to maintain the temperature in each refrigerator within a narrow desired range.

My invention may be utilized in at least two different forms of refrigerating systems. In case a refrigerating fluid, such as ammonia, is supplied to all of the coils in series, the valves of the character referred to with their controlling devices may be used to govern the proportion of fluid entering each of the coils and passing through each of the bypasses. If, however, a liquid, such as liquid ammonia, is piped from a central point to various isolated refrigerators, each of which is provided with an expansion valve for expanding the liquid into a gas as it enters the coil, the extent of opening of the expansion valve in each instance may be governed by thermostatic devices and connections, of a character embraced within my invention.

In order that my invention may be more clearly understood, attention is hereby directed to the accompanying drawings forming part of this application and illustrating certain embodiments of my invention. Referring to the drawings, Fig. 1 represents a diagrammatic front elevation of a refrigerating system embodying my invention; Fig. 2 is an enlarged vertical section taken through one of the valves and the controlling means therefor, used in the system illustrated in Fig. 1; Fig. 3 is a view partly in side elevation and partly in section showing a modified form of valve-controlling device; Fig. 4 is a diagrammatic front elevation of a refrigerating system embodying a modified form of my invention; Fig. 5 is a vertical section taken through the valve and valve chamber shown in Fig. 4; and Fig. 6 is a vertical section taken on line 6—6 of Fig. 5.

Referring first to Figs. 1, 2 and 3 of the drawings, I have illustrated a refrigerating system in which a pair of refrigerators indicated at 1 and 2 are each to be maintained within predetermined temperature limit, which may, of course, not be the same for the two refrigerators. It will be understood that the system may be applied to any desired number of refrigerators which may be connected together in the manner indicated for refrigerators 1 and 2.

In the system indicated a suitable refrigerating medium, such as ammonia, is forced by compressor 3 into the condenser 4 whence the liquid ammonia flows into receiver 5. The liquid ammonia thence flows by pipe 6 to expansion valve 7 which may be of any suitable character. The ammonia flows from valve 7 through pipe 8 to the valve chamber 9.

Valve chamber 9 has two pipes 10 and 11 leading therefrom. A valve 12 within chamber 9 is adapted to entirely open pipe 10 while entirely closing pipe 11, or vice versa, or to partly open one while proportionately closing the other. In the form of my invention illustrated the valve 12 takes the form of a sleeve which is opened at both ends so that the ammonia gas may pass through the same to enter pipe 11 when the latter is not closed by the periphery of the valve.

Pipe 11 forms the inlet for the refrigerating coil 13 in refrigerator 1. This coil is connected by an elbow 14 with an exit pipe 15, outside the refrigerator, this pipe extending into a T connection 16. The pipe 10 which constitutes the bypass for refrigerator 1 connects with T 16.

From T 16 a pipe 17 leads to valve chamber 18 which may be of the same construction as valve chamber 9. Pipe 19 constitutes the bypass for the second refrigerator coil and extends from valve chamber 18 to a T connection 20. Pipe 21 leads from valve chamber 18 to the coil 22 in refrigerator 2, an exit pipe 23 leading from this coil to the T 20. T 20 is connected by pipe 24 with the compressor 3, completing the cycle.

Valve 12 is provided with a valve stem 25 which extends through the bottom of the valve chamber and through a tube 27 into a casing 28, this casing preferably being gas tight in case of leakage of gas into the same through tube 27.

A hollow curved member 29 is mounted within casing 28, one end of this member being secured to the casing, as by means of a member 30 secured to the bottom of the casing, to which member the hollow member 29 is also secured. A pipe connection 31 is secured to the bottom of casing 28 in alinement with the member 30. Connection 31 extends to a container 32 which may be positioned within refrigerator 1. Block 30 has a passage therethrough connecting the interior of hollow member 29 with the pipe 31 and the entire system comprising members 29, 30, 31 and 32 is filled with a fluid having a high coefficient of expansion, such, for example, as alcohol or mercury.

The curved hollow member 29 is similar to the well known means used in operating a pressure gage. Increase of temperature in the refrigerator causes an increase of pressure in container 32 and accordingly in member 29, since the connected parts are entirely filled with the fluid and such increase of pressure tends to move the free end 33 of member 29 outwardly, that is, in the direction of straightening out the member. End 33 of member 29 is connected in some suitable manner with valve stem 25 so that valve 12 will be moved in accordance with the movement of point 33.

In the embodiment of my invention illustrated in Fig. 2, the lower end of the valve stem 25 rests on the end of an arm 34 of a bell-crank lever pivoted at 35 to the casing 28. The other arm 36 of the bell-crank is connected by a link 37 with the free end 33 of member 29. A spiral spring 38 is connected at one end to the valve stem 25 and at the other end to casing 28. Preferably, valve stem 25 is made of an adjustable length. This may be accomplished by providing the same with an extension 25', the adjacent ends of the stem portions 25 and 25' being provided with right hand and left hand screw threads respectively, which are received within a nut 39, so that rotating the nut in one direction or the other will serve to increase or decrease the effective length of the valve stem and the distance between valve 12 and the point of contact between the valve stem and arm 34. Also preferably arrangements are provided for adjusting the tension of spring 38 as by providing the spring with a screw threaded end portion 40 which extends through a lug 41 on the casing 28, nut 42 being provided on the threaded end 40 of the spring to increase or decrease the tension of the spring.

In operation the controlling devices for refrigerator 1 may be adjusted to maintain a temperature in refrigerator 1 of, for example, 40 to 42 degrees Fahrenheit. The parts being adjusted in the manner shown in Fig. 2, the valve 12 will be in its lower position, in which the inlet pipe 11 of coil 13 is closed, when the temperature in the refrigerator is at the lower level. When the temperature in the refrigerator rises for any reason, the expansion of member 29 raises valve 12 until pipe 11 is more or less open and bypass 10 is more or less closed. The device may be set for the desired range of temperature by adjusting the effective length of the valve stem and the tension of spring 38.

If for any reason the temperature to which container 32 is subjected should rise to an excessive degree, as by some failure of supply in the refrigerating fluid line, the expansion of the fluid within the controlling system might cause a rupture. This danger may be prevented by forming container 32 in such a manner as to permit expansion in volume of the same when the pressure therein becomes excessive. This may be accomplished, for example, by providing the surface of container 32 with corrugations 43, container 32 being preferably formed of comparatively stiff sheet metal, the stiffness of the material being calculated so that the corrugations 43 will open up somewhat when a determined rise in temperature has been exceeded.

In the operation of the system described, the refrigerator 2 is provided with a container 32', a casing 28' and a connection 31' between casing 28' and container 32', the controlling apparatus in this unit being similar to that contained in the unit previously described. The apparatus contained in the second unit may, however, be adjusted to maintain a different range of temperature in refrigerator 2 from that maintained in refrigerator 1. When refrigerator 1 is at the minimum desired temperature inlet pipe 11 will be entirely closed and all of the ammonia gas or other refrigerating fluid will pass through bypass 10 to valve chamber 18. If the temperature in refrigerator 1 rises, valve 9 will rise into position to partly open pipe 11 and partly close pipe 10 until the rise of temperature has been corrected. In any case, all of the refrigerating fluid passes to the valve chamber 18, from which point it passes through the coil 22 or through the bypass 19 or partly through one and partly through the other in accordance with the temperature conditions in refrigerator 2. It will thus be seen that the temperature of each refrigerator in a system is automatically controlled without reference to the temperature in any other refrigerator of the system.

While I deem the temperature controlling unit described above to be the best adapted for my purpose, the invention is not in its broadest aspects limited to the use of such a unit. The controlling valves such as 12 may be governed by other thermostatic devices, such, for example, as is shown in Fig. 3. In this figure a casing 28ª is shown as mounted within one of the refrigerators. A curved or coiled member 44 is mounted within this casing, this member being in the nature of a thermal spring made up of two or more strips 45 and 46 of metals having unequal co-efficients of expansion, such, for example, as steel and brass, these strips being secured together face to face. One end of the member is fixed to the casing at 47 and the other or free end of the member 48 is secured directly to a valve stem 25ª which passes out through a suitable stuffing box in casing 28ª. This valve stem is connected to a valve similar to the valve 12, this valve being mounted in a valve chamber 9ª so as to control the openings of bypass connection 10ª and inlet pipe 11ª which may be connected in the same manner as pipes 10 and 11 shown in Fig. 1.

Another application of my invention is illustrated in Figs. 4, 5 and 6. When refrigerators are at points which are somewhat distant from each other, it is common to carry a liquid refrigerant, such as ammonia, to each of the refrigerators and expand the same in an expansion valve adjacent to the refrigerator.

In the system illustrated in Fig. 4 liquid ammonia is understood to flow from the receiver 5' through a pipe 49 to an expansion valve chamber 50 adjacent to a refrigerator 51. Ammonia flows from valve chamber 50 through a pipe 52 into the refrigerating coil 53 in the refrigerator, when it is necessary to admit the ammonia to the coil for the purpose of lowering the temperature in the refrigerator. The ammonia flows from the coil though pipe 54 back to the compressor 3' from which it passes to condenser 4' and thence to the receiver 5'. Any number of pipes, such as 55 and 56, may be provided to conduct the liquid ammonia from receiver 5' to other expansion valve chambers similar to 50 and to other coils in other refrigerators from which points the gas will return to the compressor by other pipe connections similar to that indicated at 54.

The liquid ammonia enters chamber 50 by inlet pipe 49'. A valve 57 is mounted within the valve chamber to govern the amount of fluid which will be permitted to pass through the valve chamber and pass as gas through pipe 52. Valve 57 is governed by a valve stem 59 which passes through a tube 60, valve stem 59 connecting with a controlling mechanism such as that shown in Fig. 2 contained in casing 61. A container 62 is mounted within the refrigerator, this being connected by pipe 63 with the interior of a hollow curved member in casing 61 similar to the member 29 shown in Fig. 2.

When the temperature in the refrigerator is at the lower level, no ammonia is permitted to enter pipe 52. When the temperature in the refrigerator rises, however, the valve 57 will rise so as to afford a passage for the ammonia into pipe 52. Preferably, a port 64 is provided in casing 50 which is opened more or less by valve 57 to admit gas into pipe 52, this port 64 being preferably V-shaped so that refrigerating fluid will be admitted into pipe 52 in an increasing proportion as valve 57 rises.

What I claim is:—

1. In a controlling system, the combination of a circulating system for refrigerating fluid, including a coil in a refrigerator and having inlet and exit pipes, a valve chamber included in said inlet pipe, a bypass pipe leading from said valve chamber, an automatic bypass valve in said chamber adapted to be moved to vary the relative extent of the openings of said inlet pipe and said bypass pipe, a thermostatic device within the refrigerator and connections between the same and said bypass valve adapted to move the latter in one direction or the other as the temperature in the refrigerator rises or falls to simultaneously vary the extent of the openings of said inlet pipe and of said bypass pipe into said valve chamber.

2. In a controlling system, the combination of a circulating system for refrigerating fluid, including a coil in a refrigerator and having inlet and exit pipes, a valve chamber included in said inlet pipe, a bypass pipe leading from said valve chamber, an automatic bypass valve in said chamber adapted to be moved to vary the relative extent of the openings of said inlet pipe and said bypass pipe, a thermostatic device within the refrigerator and connections between the same and said bypass valve adapted to move the latter in one direction or the other as the temperature in the refrigerator rises or falls to simultaneously vary the extent of the openings of said inlet pipe and of said bypass pipe into said valve chamber, a second coil in a refrigerator, said bypass pipe leading into said coil, a valve chamber in said bypass pipe adjacent said second coil, and another bypass pipe communicating with said valve chamber, an automatic bypass valve in said second chamber adapted to vary the relative extent of the openings of said pipe leading into said second coil and of the bypass pipe, and means comprising a thermostatic device within said second refrigerator and connections between the same and said bypass valve, whereby the relative extent of the openings of the said two pipes leading from said valve chamber are simultaneously varied as the temperature in the refrigerator rises or falls.

This specification signed and witnessed this 19th day of January, 1920.

PERCY R. OWENS.

Witnesses:
DYER SMITH,
I. McINTOSH.